July 15, 1958 — H. C. CHISHOLM — 2,843,320
TRANSISTORIZED INDICATING DECADE COUNTER
Filed Dec. 21, 1956 — 3 Sheets-Sheet 1

FIG-1

INVENTOR.
HAMILTON C. CHISHOLM
BY Lippincott & Smith
ATTORNEYS

July 15, 1958     H. C. CHISHOLM     2,843,320
TRANSISTORIZED INDICATING DECADE COUNTER
Filed Dec. 21, 1956     3 Sheets-Sheet 2

FIG-2

INVENTOR.
HAMILTON C. CHISHOLM
BY
Lippincott & Smith
ATTORNEYS

United States Patent Office 2,843,320
Patented July 15, 1958

2,843,320

TRANSISTORIZED INDICATING DECADE COUNTER

Hamilton C. Chisholm, Richmond, Calif., assignor to Beckman Instruments, Inc., Fullerton, Calif., a corporation of California Application December 21, 1956, Serial No. 629,867

9 Claims. (Cl. 235—92)

This invention relates to electronic counting circuits, and in particular to improvements in transistorized counting circuits having indicator lamps for displaying the numerical value of the count.

Electronic counters are well known and widely used. In some cases they may be used simply to count and display the number of electric pulses in a pulse sequence. In other cases they may be parts of relatively complex computing equipment. A frequently used type of counter consists of four binary or scale-of-two counting stages coupled together to operate as a decade or scale-of-ten counter. Several decades may be coupled together in tandem for counting large numbers of pulses and displaying the numerical multi-digit value of the count in the familiar decimal or scale-of-ten number system. Each decade includes ten indicator lamps, usually small neon glow lamps, that are lit one at a time to display the value of the digit registered by that decade.

Heretofore, each binary counting stage for a high-speed electronic counter has usually been a vacuum tube flip-flop circuit or the like. It has become evident that significant advantages can often be obtained by replacing the vacuum tubes with transistors, which is often called transistorization. Transistor circuits have been developed that are analogous to most of the common vacuum tube circuits and this is true in the case of flip-flop circuits that can be used as binary counting stages.

However, when the transistorized binary stages are used to construct multi-stage counters, difficulties are encountered in the use of conventional glow-lamp indicator circuits because of inherent differences between the characteristics of transistors and the characteristics of vacuum tubes. Vacuum tubes are relatively high-voltage devices, and vacuum tube flip-flops provide voltage differences that are large enough for the reliable operation of neon indicator lamps without much difficulty. On the other hand, transistors are relatively low-voltage devices, and the analogous transistorized flip-flops do not provide voltage differences of sufficient magnitude for reliable operation of conventional neon-lamp indicator circuits. Accordingly an object of this invention is to provide improved transistorized counting circuits having indicator lamps for displaying the numerical value of the count.

Briefly stated, in accordance with certain aspects of this invention two or more of the binary counting stages are connected in series across the voltage supply so that the binary stages are maintained at different average electric potentials. By this means the voltages between output terminals of the binary stages are made sufficiently great for the reliable operation of conventional neon indicator lamps.

The invention will be better understood and other aspects thereof will be appreciated from the following detailed description of several illustrative embodiments taken in connection with the accompanying drawings.

Figure 1:
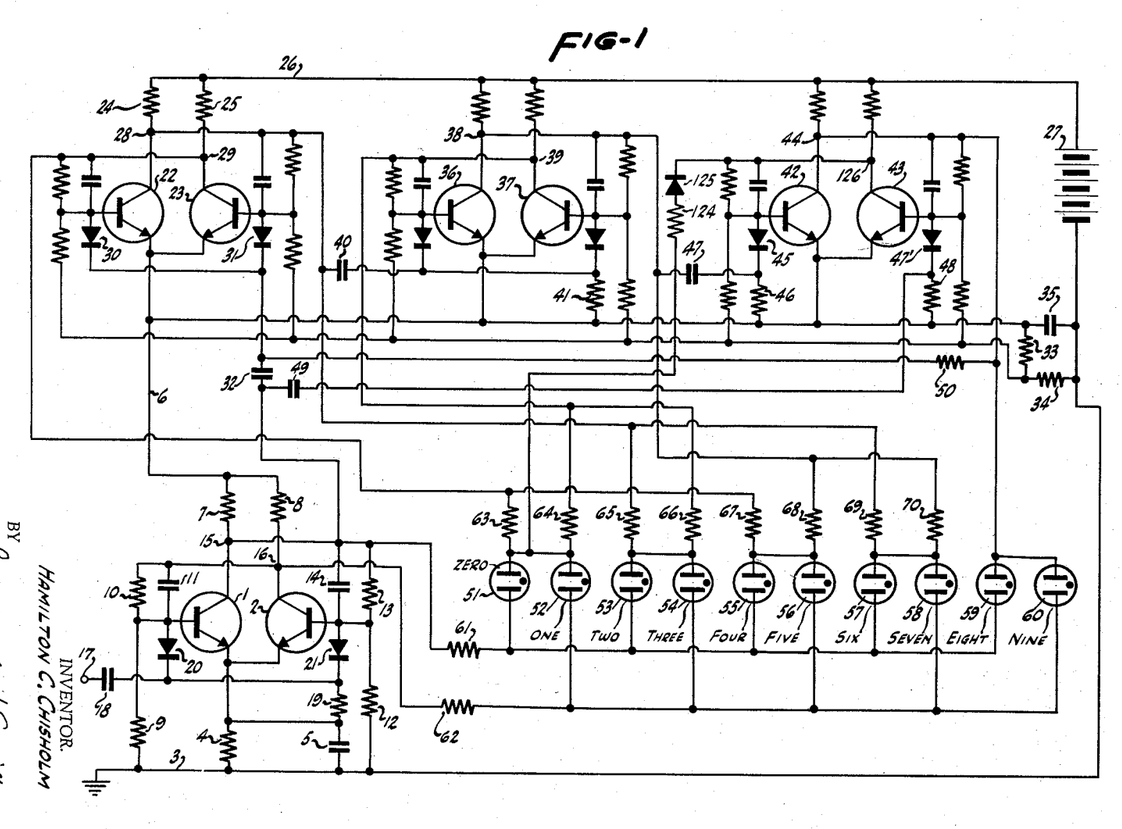
Fig. 1 is a simplified circuit diagram illustrating one embodiment of this invention.

Referring now to Fig. 1 of the drawings, a decade counter includes four transistorized binary counting stages. Each stage is a binary flip-flop comprising two transistors and having two operating states for representing the binary values or bits "0" and "1" respectively.

The first stage comprises two n-p-n transistors, represented in the drawing by the conventional symbols shown at 1 and 2. The emitters of transistors 1 and 2 are connected together and returned to ground 3 or its circuit equivalent through a resistor 4 in parallel with a by-pass capacitor 5. The collectors of transistors 1 and 2 are connected to a line 6 through resistors 7 and 8 respectively. Line 6 is maintained at a positive electric potential relative to ground 3, by means hereinafter described, for supplying operating voltages to the transistors 1 and 2. The base of transistor 1 is connected to ground 3 through a resistor 9 and is connected to the collector of transistor 2 through a resistor 10 in parallel with a capacitor 11. The base of transistor 2 is connected to ground 3 through a resistor 12 and is connected to the collector of transistor 1 through a resistor 13 in parallel with a capacitor 14.

Either of the transistors 1 and 2 can conduct current, but whenever one of these two transistors is conductive the conduction of current through the other is substantially cut off. Consequently, the circuit comprising transistors 1 and 2 has two operating states that can represent the binary values "0" and "1" selectively. It is a straightforward analog of a conventional vacuum-tube flip-flop. In one of the two operating states, current is conducted by transistor 1, and the voltage drop across resistor 7 makes the electric potential at the collector of transistor 1 more negative than the electric potential at the collector of transistor 2. In the other operating state, current is conducted by transistor 2 and the voltage drop across resistor 8 makes the electric potential at the collector of transsistor 2 more negative than the electric potential at the collector of transistor 1. Accordingly, the collectors of transistors 1 and 2, or the circuit junctions 15 and 16 connected thereto, serve as output terminals that assume different electric potentials relative to each other according to the binary value registered by this binary counting stage.

It is well known that a flip-flop of the type just described can be triggered from one operating state to the other by electric pulses supplied to various parts of the circuit. For this purpose there is provided an input circuit consisting of an input terminal 17, a coupling capacitor 18, a charge restoring resistor 19, and two crystal diode rectifiers 20 and 21, connected as shown. The polarity of rectifiers 20 and 21 is such that the circuit is responsive only to negative-going triggering pulses. Negative electric pulses supplied to input terminal 17 trigger the first stage from each to the other of its two operating states alternately. Consequently, the first stage comprising transistors 1 and 2 is a binary or scale-of-two counting stage.

The second binary stage is essentially similar to the first binary stage. The secondary stage comprises two transistors 22 and 23 having their emitters connected to line 6. The collectors of transistors 22 and 23 are connected through resistors 24 and 25 to a line 26 that is maintained at a positive electric potential relative to ground 3 by any suitable D. C. voltage supply means, such as battery 27.

Thus the first and second binary stages are connected in series across the D. C. voltage supply and line 6 is maintained at an electric potential that is intermediate between the potentials of line 26 and ground 3. This arrangement not only supplies operating voltages to both binary stages but also maintains the output terminals 28 and 29 of the second stage at average electric potentials that are more positive than the average potentials of the output terminals 15 and 16 of the first stage.

The triggering circuit for the second binary stage comprises rectifiers 30 and 31 connected as shown through coupling capacitor 32 to output terminal 15 of the first stage. The polarity of rectifiers 30 and 31 is such that the second stage responds only to negative-going triggering pulses. Such triggering pulses are supplied to the second stage each time that the condition of current is transferred from transistor 2 to transistor 1 of the first stage. This occurs upon the receipt of alternate ones of the triggering pulses supplied to input terminal 17.

The secondary binary stage differs from the first stage in two significant respects. The first difference relates to the emitter biasing means. In the first stage, a bias potential is supplied to the emitters by the voltage drop across the resistor 4 connected in series with the emitters. In the second stage an equivalent bias voltage is supplied by the voltage drop across a resistor 33 connected in series with a resistor 34 to form a voltage divider between the emitters and ground, as shown. This is a refinement that leads to circuit economy and permits use of a somewhat smaller supply voltage. A by-pass capacitor 35 is provided in parallel with resistors 33 and 34. The second difference relates to the triggering circuit wherein the rectifiers 30 and 31 are electrically returned to the common emitter voltage level through charge restoring resistor 50 and the transistor 42 for purposes that are hereinafter explained.

The third binary stage is essentially similar to the first two stages. The third stage comprises transistors 36 and 37, and it has two output terminals 38 and 39. With respect to the D. C. voltage supply the third stage is connected in parallel with the second stage and in series with the first stage. The triggering circuit of the third stage is coupled through a coupling capacitor 40 to output terminal 28 of the second stage, so that the third stage is triggered from each operating state to the other alternately upon each transfer of current from transistor 23 to transistor 22 in the second stage. The triggering circuit of the third stage is similar to the triggering circuit of the first stage.

With the exception of its triggering circuit, the fourth stage is essentially similar to the second and third stages. The fourth stage comprises transistors 42 and 43. Although both collectors of the fourth stage can supply output voltages the only output terminal of the fourth stage that is actually used is the terminal 44 connected to the collector of transistor 42. With respect to the D. C. voltage supply, the fourth stage is connected in parallel with the second and third stages and in series with the first stage.

The triggering circuit of the fourth stage is divided into two parts. In the case of the first three stages, pulses supplied to a single input trigger the stage from each state to the other state alternately. In the case of the fourth stage, there are two inputs. Pulses supplied to one of these inputs always trigger the fourth stage to a particular one of its two operating states, and have no effect if the stage is already in that operating state. Pulses supplied to the other of the two inputs always trigger the fourth stage to the other particular one of its two operating states.

One input of the fourth stage comprises the rectifier 45 and resistor 46 connected in series between the base and the emitter of transistor 42, as shown. This input is coupled through coupling capacitor 47 to output terminal 38 of the third stage. Each time that the conduction of current shifts from transistor 37 to transistor 36 in the third stage, a negative pulse is transmitted through coupling capacitor 47 and triggers the fourth stage to shift the conduction of current from transistor 42 to transistor 43.

The other input for the fourth stage comprises rectifier 47' and resistor 48 connected in series between the base and the emitter of transistor 43, as shown. This input is connected through coupling capacitor 49 to output terminal 15 of the first stage. Whenever the conduction of current shifts from transistor 2 to transistor 1 in the first stage, a negative pulse is transmitted through coupling capacitor 49 that tends to trigger the fourth stage to the state in which transistor 42 conducts current. But if transistor 42 is already conducting the triggering pulse transmitted through coupling capacitor 49 has no effect.

A resistor 50 is connected between output terminal 44 of the fourth stage and the triggering circuit of the second stage, as shown, for isolation and charge restoring purposes. While transistor 42 of the fourth stage is conducting current, output terminal 44 is at a relatively low potential and the voltage applied to rectifiers 30 and 31 in the second stage is fairly small. While this condition exists, any triggering pulses transmitted to the second stage from the first stage through coupling capacitor 32 can trigger the second stage from one to the other of its operating states.

However, when the conduction of current in the fourth stage is shifted from transistor 42 to transistor 43, the potential at terminal 44 becomes substantially more positive and a large reverse voltage or bias is applied across rectifiers 30 and 31 in the second stage. While this condition exists, triggering pulses supplied through capacitor 32 from the first stage cannot overcome the reverse voltage across rectifiers 30 and 31, and such pulses do not trigger the second stage. Consequently, the connection through resistor 50 between the fourth and second stages inhibits (or gates-off) the triggering of the second stage while the fourth stage is in that operating state in which transistor 43 is the conductive transistor.

The circuit described operates as a decade or scale-of-ten counter. For each sequence of ten electric pulses supplied to input terminal 17, the first seven pulses are counted and the numerical values of the count are represented by the eight possible combinations of operating states of the first three binary stages. (One combination of the states is required to indicate a count of zero.) Upon reception of the eighth pulse, the fourth stage is triggered to its other operating state, and counts of eight and nine are then represented by the two possible states of the first stage. Upon reception of the tenth pulse in a sequence, the circuit returns to its initial combination of states, as is required for decade or scale-of-ten counting. Numerical values larger than ten can be registered by connecting several decade counters in tandem. Manual reset provisions, and other circuit refinements, can readily be supplied by those skilled in the art, and a description thereof is not necessary for an understanding of the present invention.

The indicator circuit includes ten small neon glow lamps or the like, identified in the drawing by reference numerals 51 through 60. Each lamp has upper and lower terminals between which voltage must be applied to light the lamp. The upper terminals of the ten lamps are connected together in pairs as shown, while the lower terminals of the ten lamps are connected together in groups of five.

The lower terminals of the five odd-numbered ones of lamps 51 through 60 are connected through a resistor 61 to output terminal 15 of the first binary stage, while the lower terminals of the five even-numbered lamps are connected through a resistor 62 to the other output terminal 16 of the first stage.

The upper terminals of lamps 51 and 52 are connected through a resistor 63 to output terminal 29 of the second stage, are connected through a resistor 64 to output terminal 39 of the third stage, and are connected through a resistor 124 and a diode 125 to the terminal 126 of transistor 43. The upper terminals of lamps 53 and 54 are connected through a resistor 65 to output terminal 28 of the second stage and are connected through a resistor 66 to the output terminal 39 of the third stage. The upper terminals of lamps 55 and 56 are connected through a resistor 67 to the output terminal 29 of the second stage and are connected through a resistor 68 to the output terminal 38 of the third stage. The upper terminals of lamps 57 and 58 are connected through a resistor 69 to the output terminal 28 of the second stage and are connected through a resistor 70 to the output terminal 38 of the third stage. The upper terminals of lamps 59 and 60 are connected to output terminal 44 of the fourth stage.

With the arrangement shown and described the ten lamps 51 through 60 are lit one at a time for displaying the numerical value of the count registered in the decade counter.

For a better understanding of how the decade counter operates assume that the operating state of each binary stage represents the binary value or bit "0" when the left transistor of that stage is most conductive, and that the state of each binary stage represents the binary value or bit "1" when the right transistor of that stage is the most conductive. Further assume that all four binary stages of the decade are initially in the "0" operating state. In other words, the left transistor of each binary stage is initially the most conductive transistor of that stage. Under these conditions, output terminal 16 is more positive than output terminal 15 in the first stage, and output terminals 29 and 39 are more positive than output terminals 28, 38 and 44 in the second, third and fourth stages. Since the diode 125 is reversed biased under the stated conditions the potential at the output of transistor 43 does not affect the voltage of lamp 51. Consequently, a greater voltage is applied across the terminals of lamp 51 than is applied across the terminals of the other nine indicator lamps, and this voltage is great enough to light lamp 51. The lighting of lamp 51 displays the fact that the decade is in its initial combination of operating states, which may represent a count of "0."

Now assume that a negative electric pulse is supplied to input terminal 17. This pulse triggers the first stage from one operating state to the other, and therefore shifts the conduction of current from transistor 1 to transistor 2. Accordingly, the potential of output terminal 15 becomes more positive while the potential of output terminal 16 becomes more negative, so that terminal 15 is now at a more positive potential than terminal 16. Now there is sufficient voltage across lamp 52 to light lamp 52. The current through resistors 63 and 64 transfers from lamp 51 to lamp 52. The positive-going change in the potential of output terminal 15 of the first stage reduces the voltage across lamp 51 sufficiently to insure the reliable extinction of lamp 51. Now lamp 52 only is lit, and this indicates a count of "1" registered in the decade counter.

The next negative-going electric pulse supplied to input terminal 17 again triggers the first stage from one operating state to the other, so that the conduction of current is transferred from transistor 2 back to transistor 1. Consequently the electric potential at output terminal 15 of the first stage becomes relatively more negative, while the electric potential at output terminal 16 of the first stage becomes more positive. The negative-going change in the potential of terminal 15 transmits a negative pulse through coupling capacitor 32 that triggers the second binary stage from one state to the other and transfers the conduction of current from transistor 22 to transistor 23. As this happens, output terminal 28 of the second stage becomes more positive while output terminal 29 of the second stage becomes less positive and output terminal 28 assumes a more positive electric potential than output terminal 29.

As a result of these potential changes, a greater voltage is applied across indicator lamp 53 than is applied across the other nine indicator lamps and lamp 53 is lit. At the same time, the negative-going change in the potential of terminal 29 and the positive-going change in the potential of terminal 16 both act to reduce the voltage across lamp 52, and a sufficient voltage reduction is provided for the reliable extinction of lamp 52. Now lamp 53 only it lit, and this indicates that the decade registers a count of "2."

The next negative-going electric pulse supplied to input terminal 17 again triggers the first stage and transfers the conduction of current from transistor 1 to transistor 2. The resulting voltage changes light lamp 54 and extinguish lamp 53. Now lamp 54 only is lit, and this indicates that the decade registers a count of "3."

The next negative-going electric pulse supplied to input terminal 17 again triggers the first stage and transfers the conduction of current from transistor 2 to transistor 1. The negative pulse transmitted from the first stage through coupling capacitor 32 triggers the second stage and transfers the conduction of current from transistor 23 back to transistor 22. As transistor 22 begins to conduct current, the negative-going change in the potential of output terminal 28 of the second stage transmits a negative electric pulse through coupling capacitor 40 that triggers the third binary stage and transfers the conduction of current from transistor 36 to transistor 37. The resulting voltage changes light lamp 55 and extinguish lamp 54. Now lamp 55 only is lit, and this indicates that the decade registers a count of "4."

The next negative-going electric pulse supplied to input terminal 17 triggers the first stage and transfers the conduction of current from transistor 1 to transistor 2. The resulting voltage changes light lamp 56 and extinguish lamp 55, after which lamp 56 only is lit. This indicates that the decade now registers a count of "5."

The next negative-going electric pulse supplied to input terminal 17 triggers the first stage and transfers the conduction of current from transistor 2 to transistor 1. The first stage transmits a negative electric pulse through coupling capacitor 32 that triggers the second stage and transfers the conduction of current from transistor 22 to transistor 23. The resulting voltage changes light lamp 57 and extinguish lamp 56, after which lamp 57 only is lit. This indicates that the decade now registers a count of "6."

The next negative-going electric pulse supplied to input terminal 17 triggers the first stage and transfers the conduction of current from transistor 1 to transistor 2. The resulting voltage changes light lamp 58 and extinguish lamp 57. Now lamp 58 only is lit, which indicates that the decade registers a count of "7."

The eighth negative-going electric pulse supplied to input terminal 17 triggers the first stage and transfers the conduction of current from transistor 2 to transistor 1. The first stage transmits a negative pulse through coupling capacitor 32 that triggers the second stage and transfers the conduction of current from transistor 23 to transistor 22. The second stage transmits a negative pulse through coupling capacitor 40 that triggers the third stage and transfers the conduction of current from transistor 37 to transistor 36. As transistor 36 begins to conduct current, there is a negative-going change in the potential of output terminal 38 of the third stage, and this transmits a negative pulse through coupling capacitor 47 that triggers the fourth stage and transfers the conduction of current from transistor 42 to transistor 43. As the current through transistor 42 is reduced, output terminal 44 of the fourth stage becomes more positive and provides a sufficient voltage across lamp 59 to light lamp 59.

It will be noted that the eighth pulse applied has transferred the conduction of current to the left transistor of the first, second, and third stages, and that the potential of output terminals 29 and 39 is once again relatively high. Consequently, the potential applied to lamp 51 tends to be sufficient to light lamp 51. However, the junction of lamps 51 and 52 are also connected through resistor 124 and diode 125 to the terminal 126 of transistor 43 in the fourth stage. Since the potential of this output is relatively low due to conduction of the transistor 43, the diode 125 is forward biased and effectively lowers the potential of the junction of lamps 51 and 52 such that the lighting of both of these lamps is inhibited.

It will also be noted that the upper terminals of lamps 59 and 60 are connected directly to output terminal 44 of the first stage, or are connected through a relatively low resistance, so that there is less resistance in series with lamps 59 and 60 than there is in series with lamps 51 through 58. Consequently, when lamp 59 is lit it conducts more current than was conducted by any one of the lamps 51 through 58, and this increased current produces a larger voltage drop across resistor 61 to further inhibit the lighting of the lamps 51, 53, 55 and 57. The even-numbered lamps cannot be lit at this time because of the relatively positive potential of output terminal 16 of the first stage. Consequently, after reception of the eighth input pulse, lamp 59 only is lit, and this indicates that a count of "8" is registered by the decade.

A further consequence of the more positive potential assumed by output terminal 44 of the fourth stage while transistor 43 is the more conductive transistor of that stage, is that a more positive potential is transmitted through resistor 50 to the triggering circuit of the second stage, and a large reverse voltage is provided across diode rectifiers 30 and 31. So long as this condition exists, any negative pulses transmitted through coupling capacitor 32 from the first stage cannot overcome the reverse voltage across rectifiers 30 and 31, and triggering of the second stage by such pulses is inhibited.

The ninth negative-going electric pulse supplied to input terminal 17 triggers the first stage and transfers the conduction of current from transistor 1 to transistor 2. The resulting voltage changes light lamp 60 and extinguish lamp 59. Now lamp 60 only is lit, and this indicates that a count of "9" is registered by the decade.

The tenth negative-going electric pulse supplied to input terminal 17 restores the decade to its initial combination of operating states in the following manner.

The input pulse triggers the first binary stage and transfers the conduction of current from transistor 2 to transistor 1. The negative-going change in the potential of output terminal 15 of the first stage transmits a negative electric pulse through coupling capacitor 32, but this pulse is ineffective to trigger the second stage because of the relatively large reverse voltage provided across rectifiers 30 and 31 by the connection through resistor 50 to output terminal 44 of the fourth stage, which is at a relatively high positive potential at this time. Consequently, the second and third stages remain in the operating states that they had immediately before the tenth input pulse, in which transistors 22 and 36 are more conductive than transistors 23 and 37.

The negative-going change in the potential of output terminal 15 of the first stage also transmits a negative pulse through coupling capacitor 49, which triggers the fourth stage and transfers the conduction of current from transistor 43 back to transistor 42. Consequently, all four binary stages are returned to their initial operating states in which the left transistor of each stage is the more conductive. As the conduction of current through transistor 42 increases, output terminal 44 of the fourth stage becomes less positive, and lamp 51 is lit while lamp 60 is extinguished.

Thus a decade or scale-of-ten counter is provided which counts up to nine and is reset to zero by each tenth input pulse. The digit registered by the decade is indicated by the indicator lamp that is lit.

Where counts greater than ten must be registered, several identical decade counters can be connected in tandem in the usual way. A negative-going change in the potential of output terminal 44 of the fourth stage occurs upon the reception of each tenth one of the input pulses supplied to input terminal 17. Consequently, any desired number of identical decades can be connected in tandem simply by connecting the input terminal 17 of each decade to the output terminal 44 of the fourth stage of the preceding decade.

It should be noted that each of the first three binary stages have their input circuits so arranged that triggering pulses supplied to a single input trigger the binary stage from each to the other of its operating states alternately. The fourth stage has two inputs so arranged that a triggering pulse supplied to one input always tends to trigger the fourth stage to a particular one of its two operating states, while a triggering pulse supplied to the other input always tends to trigger the fourth stage to the other particular one of its two operating states.

In other words, negative pulses supplied to the fourth stage through coupling capacitor 47 always transfer the conduction of current from transistor 42 to transistor 43. Negative pulses supplied to the fourth stage through coupling capacitor 49 transfer the conduction of current from transistor 43 to transistor 42 whenever transistor 43 was the more conductive transistor immediately before receipt of the triggering pulse. On the other hand, pulses transmitted through capacitor 49 have no effect upon the fourth stage if transistor 42 was the more conductive transistor immediately before receipt of the triggering pulse. When triggering pulses are transmitted through capacitors 47 and 49 substantially simultaneously, as occurs following reception of the eighth input pulse at terminal 17, the effect on the fourth stage is the same as if the two inputs were connected together in a manner similar to the input circuit of the first three binary stages, and the conduction of current is transferred from transistor 42 to transistor 43 in the manner hereinbefore explained.

It will be noted that, in the D. C. or power-supply circuit, the first binary stage is connected in series with the second, third and fourth binary stages in parallel. It is usually not desirable that the first stage conduct three times as much current as each of the other three binary stages. In the circuit shown in Fig. 1, this is taken care of by the fact that resistance voltage divider 33—34 is connected in parallel with the first stage and therefore conducts part of the current that passes through the second, third and fourth stages in parallel.

Figure 2:
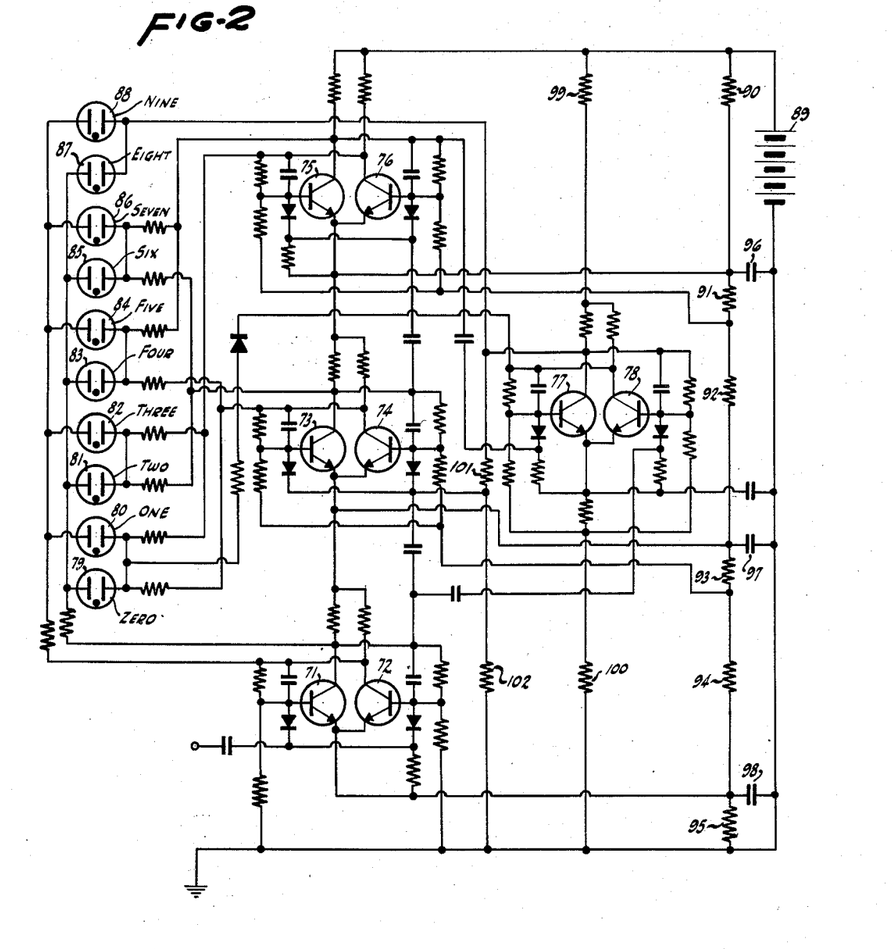
Fig. 2 is a simplified circuit diagram illustrating another embodiment of this invention.

It is not essential that the second, third and fourth binary stages should all be connected together in parallel. Fig. 2 of the drawings illustrates an embodiment wherein the first, second, and third stages are all connected in series.

Referring now to Fig. 2, the first binary stage comprises transistors 71 and 72, the second binary stage comprises transistors 73 and 74, the third binary stage comprises transistors 75 and 76, and the fourth binary stage comprises transistors 77 and 78. The ten indicator lamps are identified by reference numbers 79 through 88. Except for the manner in which the four stages are connected to the D. C. supply, the decade counter illustrated in Fig. 2 is essentially identical to the decade counter illustrated in Fig. 1. Therefore it is not necessary to describe the counter illustrated in Fig. 2 in detail.

The first, second and third binary stages are connected in series as shown across a suitable D. C. supply represented in the drawing by battery 89. For stabilizing the supply voltage of each stage, as well as to provide bias voltages and to make possible the use of a somewhat smaller total supply voltage than would be required if bias voltages were provided by resistors in series with each stage, there is provided a voltage divider consisting of resistors 90, 91, 92, 93, 94 and 95 and by-pass capacitors 96, 97 and 98, connected as shown.

A fourth binary stage is connected across the power supply in series with resistors 99 and 100, which are so proportioned that the output terminal of the fourth stage has an average potential that lies approximately half-way between the average potentials of the output terminals of the second and third stages. Since first terminals of indicator lamps 87 and 88 are connected directly to the output terminal of the fourth binary stage, while the corresponding terminals of indicator lamps 79 through 86 are connected to resistance voltage dividers between output terminals of the second and third stages, the terminals of all ten indicator lamps are maintained at substantially the same average electric potential and proper operation of the indicator lamps is assured.

Because the output terminal of the fourth stage has a more positive potential than is desirable for biasing the triggering circuit of the second stage, the triggering circuit of the second stage is connected to a voltage divider consisting of resistors 101 and 102 between the output terminal of the fourth stage and ground, as shown.

Figure 3:
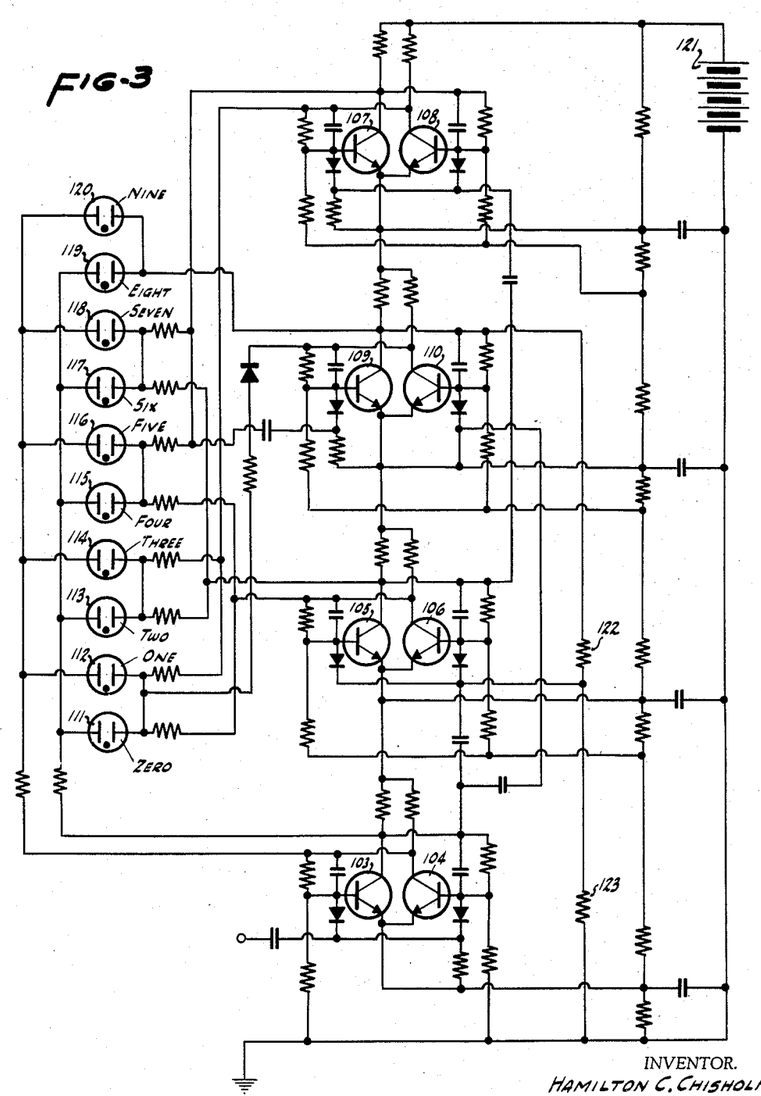
Fig. 3 is a simplified circuit diagram illustrating still another embodiment of this invention.

Fig. 3 illustrates an embodiment in which all four binary stages are connected in series across the power supply. Referring to Fig. 3, the first binary stage comprises transistors 103 and 104, the second binary stage comprises transistors 105 and 106, the third binary stage comprises transistors 107 and 108, and the fourth binary stage comprises transistors 109 and 110. The ten indicator lamps are identified by reference numerals 111 through 120. The four binary counting stages are connected in series across a suitable D. C. power supply, represented in the drawing by battery 121. Except for the manner in which the four binary stages are connected to the power supply, the embodiment illustrated in Fig. 3 is substantially identical to the embodiments illustrated in Figs. 1 and 2, and therefore a detailed description of the Fig. 3 embodiment is unnecessary. All three embodiments operate in essentially the same manner.

In the case of the embodiment illustrated in Fig. 3, the fourth binary stage is connected in series between the second and third binary stages with respect to the D. C. supply circuit, so that the average potential of the output terminal of the fourth stage is approximately mid-way between the average potentials of the output terminals of the second and third stages. Since first terminals of indicator lamps 119 and 120 are connected directly to the output terminal of the fourth stage, while the corresponding terminals of indicator lamps 111 through 118 are connected to resistance voltage dividers between output terminals of the second and third stages, corresponding terminals of all ten indicator lamps are supplied with approximately the same average electric potentials. This insures proper operation of the indicator lamp circuits.

However, the output terminal of the fourth stage has an average potential that is more positive than the bias potential required for the second binary stage, and therefore the triggering circuit of the second stage is connected to a voltage divider consisting of resistors 122 and 123 connected in series, as shown, between the output terminal of the fourth binary stage and ground.

In all three of the illustrated embodiments, the output terminal of one binary stage has an average electric potential different from the average potentials of the output terminals of the second and third binary stages. In the case of the embodiment illustrated in Fig. 1, this is accomplished by making the second, third and fourth stages all have substantially the same average electric potential at their output terminals, while in the embodiments illustrated in Figs. 2 and 3 an equivalent result is accomplished by supplying the fourth stage with operating potentials that are intermediate between the operating potentials supplied to the second and third stages.

This arrangement is advantageous since all of the ten indicator lamps can be operated at substantially equal average potentials while two of the lamps are directly connected to the output terminal of the fourth binary stage. It is possible to construct a decade counter in which the fourth binary stage is supplied with operating potentials that are not intermediate between those supplied to the second and third stages.

For example, the position of the third and fourth stages with respect to the D. C. supply circuit might be interchanged in the embodiment illustrated in Fig. 3.

In this case, however, it would be necessary to connect indicator lamps 119 and 120 to the output terminal of the fourth binary stage through a voltage divider so that all ten indicator lamps would be supplied with approximately the same average potential. Furthermore, this voltage divider connected to the output terminal of the fourth stage would have to have a relatively low resistance compared to the resistors in series with indicator lamps 111 through 118, so that lamps 119 and 120 would draw more current than the other lamps when they were lit. Also, the use of a voltage divider would necessarily reduce the amount of switching voltage available upon a change in the operating state of the fourth stage. Consequently, the arrangements illustrated are preferred.

In its broader aspects the principles of this invention are not limited to transistorized decade counters made up of binary stages, but are also applicable to other types of multi-stage counting circuits. Furthermore, it should be understood that this invention is not limited to specific embodiments herein illustrated and described, and that the following claims are intended to cover all changes and modifications that do not depart from the true spirit and scope of the invention.

What is claimed is:

1. In combination, a plurality of electronic counting stages coupled together to form a multi-stage counter, each of said stages having output terminals that assume different electric potentials corresponding to different numerical values registered by that stage, voltage supply means for supplying operating voltage to said counting stages and maintaining the output terminals of one of said stages at average electric potentials different from the average potentials of the output terminals of others of said stages, and a plurality of indicator lamps connected in circuits between the output terminals of said one stage and the output terminals of said other stages so that different ones of said lamps are lit corresponding to different numerical values registered by the multi-stage counter.

2. A decade counter comprising four electronic counting stages each having two operating stages representing the binary values "0" and "1" respectively, an input circuit for supplying electric pulses to trigger a first one of said stages from each to the other of said states alternately, coupling means for supplying electric pulses to trigger a second one of said stages from each to the other of said states alternately upon said first state changing from the "1" state to the "0" state, coupling means for supplying electric pulses to trigger a third one of said stages from each to the other of said states alternately upon said second stage changing from the "1" state to the "0" state, coupling means for supplying electric pulses to trigger a fourth one of said stages to the "1" state upon said third stage changing from the "1" state to the "0" state, coupling means for supplying electric pulses to trigger said fourth stage from the "1" state to the "0" state upon said first stage changing from the "1" state to the "0" state, means inhibiting the triggering of said second stage while said fourth stage is in the "1" state, said four stages having output terminals that assume different electric potentials depending on the operating state of that stage, D. C. supply means for supplying operating voltage to said four stages, said first stage being connected in series with other ones of said stages across said supply means so that the output terminals of said first stage have a different average electric potential from the output terminals of said other stages, and decade indicator means connected between the output terminals of said first stage and the output terminals of said second, third, and fourth stages.

3. An electronic counter comprising two transistorized binary counting stages connected in series across a voltage supply means, each of said stages having two operating states for registering either of two binary values selectively, each of said stages having two output terminals that assume different electric potentials relative to each other according to the binary value registered by that stage, two indicator lamps connected between one output terminal of one of said stages and respective output terminals of the other of said stages, and two other indicator lamps connected between the other output terminal of said one stage and respective output terminals of said other stage, so that said four lamps are lit one at a time to indicate the four combinations of binary values that may be registered by said two stages.

4. An indicating decade counter comprising four transistorized binary counting stages each having two operating states herein called the "0" state and the "1" state, an input circuit for supplying electric pulses to trigger a first one of said stages from each state to the other alternately, coupling means for supplying electric pulses to trigger a second one of said stages from each state to the other alternately upon said first stage changing from the "1" state to the "0" state, coupling means for supplying electric pulses to trigger a third one of said stages from each state to the other alternately upon said second stage changing from the "1" state to "0" state, coupling means for supplying electric pulses to trigger a fourth one of said stages to the "1" state upon said third stage changing from the "1" state to the "0" state, coupling means for supplying electric pulses to trigger said fourth stage to the "0" state upon said first stage changing from the "1" state to the "0" state, means inhibiting the triggering of said second stage while said fourth stage is in the "1" state, said first, second and third stages each having first and second output terminals that assume different electric potentials relative to each other according to the operating state of that stage, said fourth stage having an output terminal that assumes either of two electric potentials selectively according to the operating state of said fourth stage, D. C. supply means for maintaining the average electric potential of said output terminals of said first stage at a different value from the average electric potentials of said output terminals of any of the other three stages, ten indicator glow lamps each having first and second terminals, said first terminals of first and second ones of said lamps being connected together, said first terminals of third and fourth ones of said lamps being connected together, said first terminals of fifth and sixth ones of said lamps being connected together, said first terminals of seventh and eighth ones of said lamps being connected together, said first terminals of ninth and tenth ones of said lamps being connected together, two resistors connecting said first terminals of the first and second lamps to said second output terminals of the second and third stages respectively, two resistors connecting said first terminals of the third and fourth lamps to said first output terminal of the second stage and said second output terminal of the third stage respectively, two resistors connecting said first terminals of the fifth and sixth lamps to said second output terminal of the second stage and said first output terminal of the third stage respectively, two resistors connecting said first terminals of the seventh and eighth lamps to said first output terminals of the second and third stages respectively, means connecting said first terminals of the ninth and tenth lamps to said output terminal of the fourth stage, the circuit resistance in series with said ninth and tenth lamps being smaller than the circuit resistances in series with the other eight lamps, said second terminals of the first, third, fifth, seventh, and ninth lamps being connected together and being connected through a resistor to said first output terminal of the first stage, said second terminals of the second, fourth, sixth, eighth and tenth lamps being connected together and being connected through a resistor to said second output terminal of the first stage, whereby said ten lamps are lit one at a time to provide a decade indication of the ten combinations of operating states that said four stages can assume.

5. An indicating decade counter comprising four transistorized binary counting stages each having two operating states herein called the "0" state and the "1" state, an input circuit for supplying electric pulses to trigger a first one of said stages from each state to the other state alternately, coupling means for supplying electric pulses to trigger a second one of said stages from each state to the other state alternately upon said first state changing from the "1" state to the "0" state, coupling means for supplying electric pulses to trigger a third one of said stages from each state to the other state alternately upon said second state changing from the "1" state to the "0" state, coupling means for supplying electric pulses to trigger a fourth one of said stages to the "1" state upon said third stage changing from the "1" state to the "0" state, coupling means for supplying electric pulses to trigger said fourth state to the "0" state upon said first stage changing from the "1" state to the "0" state, means inhibiting the triggering of said second stage while said fourth stage is in the "1" state, each of said stages having a first output terminal that assumes one electric potential while that state is in the "0" state and assumes a more positive electric potential while that stage is in the "1" state, said first, second, and third stages each having a second output terminal that assumes one electric potential while that stage is in the "1" state and assumes a more positive electric potential while that stage is in the "0" state, D. C. supply means for maintaining the average electric potentials of said output terminals of the first stage more negative than the average electric potentials of said output terminals of the other three stages, ten indicator glow lamps each having first and second terminals, said first terminals of the ten lamps being connected together in pairs, four of said pairs being connected to resistance voltage dividers extending between respective output terminals of said second and third stages, the fifth of said pairs being connected to said first output terminal of the fourth stage, said second terminals of the ten lamps being connected together in two groups of five, said two groups of five being connected through resistors to respective ones of the two output terminals of said first stage, whereby said ten lamps are lit one at a time to provide a decade indication of the ten combinations of operating states that said four stages can assume.

6. A decade counter comprising four transistorized binary counting stages each having two operating states, an input circuit for supplying electric pulses to trigger a first one of said stages from each to the other of said states alternately, coupling means for supplying electric pulses to trigger a second one of said stages from each to the other of said states alternately upon each alternate triggering of said first stage, coupling means for supplying electric pulses to trigger a third one of said stages from each to the other of said states alternately upon each alternate triggering of said second stage, coupling means for supplying electric pulses to trigger a fourth one of said stages from a first to a second of said states upon each alternate triggering of said third stage, coupling means for supplying electric pulses to trigger said fourth stage from said second state to said first state upon each alternate triggering of said first stage, means inhibiting the triggering of said second stage while said fourth stage is in said second state, whereby there are ten combinations of operating states that can be assumed by said four stages, said first, second and third stages each having two output terminals that assume different electric potentials relative to each other according to the operating state of that stage, said fourth stage having an output terminal that assumes either of two different electric potentials selectively according to the operating state of said fourth stage, D. C. supply means for maintaining the average potential of said output terminal of the fourth stage at a value substantially equal to the average of the electric potentials of said four output terminals of the second and third stages, D. C. supply means for maintaining the average potential of said output terminals of the first stage at a value different from the average potential of said output terminal of the fourth stage, and ten indicator lamps connected in circuits between said output terminals of the first stage and said output terminals of the second, third, and fourth stages so that said lamps are lit one at a time according to the ten combinations of operating states that said four stages can assume.

7. A decade counter comprising four transistorized binary counting stages each having two operating states, an input circuit for supplying electric pulses to trigger a first one of said stages from each to the other of said states alternately, coupling means for supplying electric pulses to trigger a second one of said stages from each to the other of said states alternately upon each alternate triggering of said first stage, coupling means for supplying electric pulses to trigger a third one of said stages from each to the other of said states alternately upon each alternate triggering of said second stage, coupling means for supplying electric pulses to trigger a fourth one of said stages from a first to a second of said states upon each alternate triggering of said third stage, coupling means for supplying electric pulses to trigger said fourth stage from said second state to said first state upon each alternate triggering of said first stage, means inhibiting the triggering of said second stage while said fourth stage is in said second state, whereby there are ten combinations of operating states than can be assumed by said four stages, said first, second, and third stages each having two output terminals that assume different electric potentials relative to each other according to the operating state of that stage, said fourth stage having an output terminal that assumes either of two different electric potentials selectively according to the operating state of said fourth stage, voltage supply means, said second, third, and fourth stages being connected in parallel with one another and in series with said first stage across said voltage supply means, and ten indicator lamps connected in circuits between said output terminals of the first stage and said output terminals of the second, third, and fourth stages so that said lamps are lit one at a time according to the ten combinations of operating states that said four stages can assume.

8. A decade counter comprising four transistorized binary counting stages each having two operating states, an input circuit for supplying electric pulses to trigger a first one of said stages from each to the other of said states alternately, coupling means for supplying electric pulses to trigger a second one of said stages from each to the other of said states alternately upon each alternate triggering of said first stage, coupling means for supplying electric pulses to trigger a third one of said stages from each to the other of said stages alternately upon each alternate triggering of said second stage, coupling means for supplying electric pulses to trigger a fourth one of said stages from a first to a second of said states upon each alternate triggering of said third stage, coupling means for supplying electric pulses to trigger said fourth stage from said second state to said first state upon each alternate triggering of said first stage, means inhibiting the triggering of said second stage while said fourth stage is in said second state, whereby there are ten combinations of operating states that can be assumed by said four stages, said first, second and third stages each having two output terminals that assume different electric potentials relative to each other according to the operating state of that stage, said fourth stage having an output terminal that assumes either of two different electric potentials selectively according to the operating state of said fourth stage, voltage supply means, said first, second and third stages being connected in series with one another across said voltage supply means, said fourth stage being connected in series with resistors across said voltage supply means so that the average electric potential of said output terminal of the fourth stage is intermediate in value between the average potentials of said output terminals of the second and third stages, and ten indicator lamps connected in circuits between said output terminals of the first stage and said output terminals of the second, third and fourth stages so that said lamps are lit one at a time according to the ten combinations of operating states that said four stages can assume.

9. A decade counter comprising four transistorized binary counting stages each having two operating states, an input circuit for supplying electric pulses to trigger a first one of said stages from each to the other of said states alternately, coupling means for supplying electric pulses to trigger a second one of said stages from each to the other of said states alternately upon each alternate triggering of said first stage, coupling means for supplying electric pulses to trigger a third one of said stages from each to the other of said states alternately upon each alternate triggering of said second stage, coupling means for supplying electric pulses to trigger a fourth one of said stages from a first to a second of said states upon each alternate triggering of said third stage, coupling means for supplying electric pulses to trigger said fourth stage from said second state to said first state upon each alternate triggering of said first stage, means inhibiting the triggering of said second stage while said fourth stage is in said second state, whereby there are ten combinations of operating states that can be assumed by said four stages, said first, second, and third stages each having two output terminals that assume different electric potentials relative to each other according to the operating state of that stage, said fourth stage having an output terminal that assumes either of two different electric potentials selectively according to the operating state of said fourth stage, voltage supply means, said four stages being connected in series with one another across said voltage supply means with said fourth stage between said second and third stages, and ten indicator lamps connected in circuits between said output terminals of the first stage and said output terminals of the second, third and fourth stages so that said lamps are lit one at a time according to the ten combinations of operating states that said four stages can assume.

<center>No references cited.</center>

UNITED STATES PATENT OFFICE

CERTIFICATE OF CORRECTION

Patent No. 2,843,320                                         July 15, 1958

Hamilton C. Chisholm

It is hereby certified that error appears in the printed specification of the above numbered patent requiring correction and that the said Letters Patent should read as corrected below.

Column 2, line 41, for "transsistor" read -- transistor --; line 63, for "secondary" read -- second --; column 3, line 13, for "condition" read -- conduction --; line 17, for "secondary" read -- second --; column 6, line 5, for "it" read -- is --; column 9, line 56, for "one binary stage" read -- the fourth binary stage --; column 9, line 57, for "different from" read -- that lies substantially mid-way between --.

Signed and sealed this 21st day of October 1958.

(SEAL)

Attest:

KARL H. AXLINE
Attesting Officer

ROBERT C. WATSON
Commissioner of Patents